US012608833B2

(12) United States Patent
Zuo et al.

(10) Patent No.: US 12,608,833 B2
(45) Date of Patent: Apr. 21, 2026

(54) THREE-DIMENSIONAL MEASUREMENT METHOD BASED ON END-TO-END DEEP LEARNING FOR SPECKLE PROJECTION

(71) Applicant: Nanjing University of Science and Technology, Nanjing (CN)

(72) Inventors: Chao Zuo, Nanjing (CN); Qian Chen, Nanjing (CN); Shijie Feng, Nanjing (CN); Wei Yin, Jiangsu (CN); Jiasong Sun, Nanjing (CN); Yuzhen Zhang, Nanjing (CN); Guohua Gu, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 468 days.

(21) Appl. No.: 18/025,815

(22) PCT Filed: Aug. 18, 2021

(86) PCT No.: PCT/CN2021/113187
§ 371 (c)(1),
(2) Date: Mar. 10, 2023

(87) PCT Pub. No.: WO2022/057556
PCT Pub. Date: Mar. 24, 2022

(65) Prior Publication Data
US 2024/0020866 A1     Jan. 18, 2024

(30) Foreign Application Priority Data
Sep. 18, 2020     (CN) .......................... 202010982857.3

(51) Int. Cl.
*G06T 7/593*        (2017.01)
*G06T 3/4007*       (2024.01)
(Continued)

(52) U.S. Cl.
CPC ............ *G06T 7/593* (2017.01); *G06T 3/4007* (2013.01); *G06T 7/194* (2017.01); *G06V 10/44* (2022.01); *G06T 2207/20228* (2013.01)

(58) Field of Classification Search
CPC ....... G06T 7/593; G06T 7/194; G06T 3/4007; G06T 2207/20228; G06V 10/44
See application file for complete search history.

(56) References Cited

U.S. PATENT DOCUMENTS 9,582,889 B2 *   2/2017   Shpunt ................... G01B 11/25
2020/0193580 A1   6/2020   McCall et al.

FOREIGN PATENT DOCUMENTS

CN        110111271 A      8/2019
CN        111563564 A      8/2020
CN        112419386 A      2/2021

* cited by examiner

*Primary Examiner* — Matthew C Bella
*Assistant Examiner* — Jinsu Hwang
(74) *Attorney, Agent, or Firm* — Birch, Stewart, Kolasch & Birch, LLP

(57)                ABSTRACT
The invention discloses a three-dimensional (3D) measurement method based on end-to-end deep learning for speckle projection. First, the speckle pattern was projected by the projector and collected simultaneously by the stereo camera. The speckle images after stereo rectification are fed into the stereo matching network. A feature extraction sub-network based on shared weights processes the speckle images to obtain a series of low-resolution 3D feature tensors. The feature tensor is fed into the saliency object detection sub-network to detect foreground information in the speckle images, producing a full-resolution valid mask map. A 4D matching cost volume is generated using the feature tensor of both views based on the candidate disparity range, filtered by a series of 3D convolutional layers to achieve cost aggregation, so that the initial disparity map is obtained by
(Continued)

disparity regression. The final disparity map is obtained by combining the mask map and the initial disparity map to achieve a single-frame, robust, and absolute 3D shape measurement. The invention achieves a single-frame, robust, and absolute 3D shape measurement by projecting a single speckle pattern.

6 Claims, 2 Drawing Sheets

(51) Int. Cl.
  *G06T 7/194*          (2017.01)
  *G06V 10/44*          (2022.01)

The speckle pattern is projected by the projector and collected simultaneously by the stereo camera and the speckle images are stereo rectified and fed into the stereo matching network;

A feature extraction sub-network based on shared weights processes the speckle images to obtain a series of low-resolution 3D feature tensors with customized size The feature tensors are fed into the salient object detection sub-network to detect foreground information in the speckle images, producing a full-resolution valid mask map.

A 4D matching cost volume is generated using the feature tensor of both views based on the candidate disparity range, filtered by a series of 3D convolutional layers to achieve cost aggregation, so that the initial disparity map is obtained by disparity regression The final disparity map is obtained by combining the mask map and the initial disparity map

Fig. 1

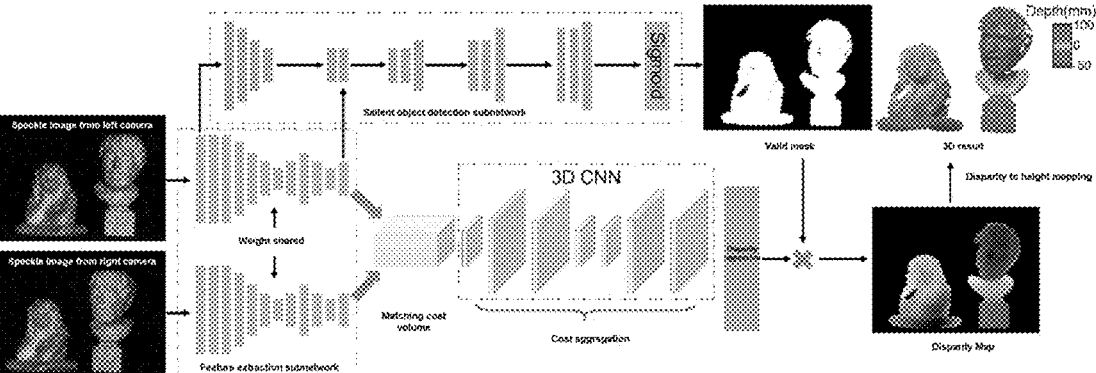

Fig. 2

THREE-DIMENSIONAL MEASUREMENT METHOD BASED ON END-TO-END DEEP LEARNING FOR SPECKLE PROJECTION

FIELD OF THE INVENTION

The invention belongs to the field of three-dimensional (3D) measurement technology, in particular to a 3D measurement method based on end-to-end deep learning for speckle projection.

BACKGROUND OF THE INVENTION

In recent decades, fast 3D shape measurement technology has been widely used in various fields, such as intelligent monitoring, industrial inspection and 3D face recognition. Among the 3D shape measurement methods, speckle projection profilometry based on structured light projection and triangulation principles is one of the most practical techniques due to its advantages of non-contact, full-field, fast, and efficient. Speckle projection profilometry (SPP), which is suitable for dynamic 3D acquisition, can establish the global correspondence between a pair of speckle stereo images by projecting a single speckle pattern. However, SPP has the problem of low matching accuracy of traditional stereo matching algorithm.

SUMMARY OF THE INVENTION

The object of the invention is to provide a 3D measurement method based on end-to-end deep learning for speckle projection The technical solution for achieving the object of the invention is: a 3D measurement method based on end-to-end deep learning for speckle projection, comprising the steps:

step one, the speckle pattern was projected by the projector and collected simultaneously by the stereo camera. The speckle images are stereo rectified;

step two, a feature extraction sub-network based on shared weights processes the speckle images to obtain a series of low-resolution 3D feature tensors with customized size;

step three, the feature tensor is fed into the salient object detection sub-network to detect foreground information in the speckle images, producing a full-resolution valid mask map;

step four, a 4D matching cost volume is generated using the feature tensor of both views based on the candidate disparity range, filtered by a series of 3D convolutional layers to achieve cost aggregation, so that the initial disparity map is obtained by disparity regression;

step five, the final disparity map is obtained by combining the mask map and the initial disparity map.

Preferably, step two, the process of a feature extraction sub-network based on shared weights processing the speckle images to obtain a series of low-resolution 3D feature tensors with customized size is: the speckle images with size H×W are processed by three convolution layers with the same number of output channels to obtain a tensor of size 32×H×W;

A tensor of size 32×H/2×W/2 is obtained through a convolution layer with two steps; A tensor of size 32×H/2×W/2 is obtained through three residual blocks in succession;

A tensor of size 64×H/2×W/2 is obtained through sixteen residual blocks;

A tensor of size 128×H/2×W/2 is obtained through six residual blocks;

Then, a tensor of size 128×H/2×W/2 is then downsampled at different scales by the average pooling layer and convolution layer with size of (5,5), (10,10), (20,20) and (40,40) respectively, and a tensor with original resolution is obtained by bilinear interpolation;

The tensor of original resolution is spliced with the tensor of size 64×H/2×W/2 and the tensor of size 128×H/2×W/2 on the feature channel to obtain a tensor of size 320×H/2×W/2;

A tensor of size 32×H/2×W/2 is obtained through two convolution layers;

Preferably, step three, the process of the feature tensor fed into the salient object detection sub-network to detect foreground information in the speckle images, producing a full-resolution valid mask map is: a tensor of size 32×H/2×W/2 is fed into three residual blocks to obtain a tensor of 64×H/2×W/2; A tensor of size 32×H×W is obtained through a deconvolution layer; A tensor of size 32×H×W is obtained through three residual blocks; A tensor of size 1×H×W is obtained through a convolution layer without active operation; The final full-resolution valid mask image is obtained through a Sigmoid layer.

Preferably, step four, a 4D matching cost volume is generated using the feature tensor of both views based on the candidate disparity range:

$$Cost(1:32,D_i-D_{min}+1,1:H,1:W-D_i)=Feature_{left}(1:32,1:H,1:W-D_i)$$

$$Cost(33:64,D_i-D_{min}+1,1:H,1:W-D_i)=Feature_{right}(1:32,1:H,D_i:W)$$

where $Feature_{left}$ and $Feature_{right}$ represent the feature tensors from two perspectives output, their size is 32×H/2×W/2, $[D_{min}, D_{max}]$ is the disparity range of our system, $D_i$ is a candidate disparity in the range.

Preferably, the process of the initial disparity map obtained by disparity regression is:

The matching cost volume is fed into the Softmax layer and the initial disparity map is obtained by disparity regression, as the following equation:

$$Disparity = \sum_{d=D min}^{D_{max}} d * Softmax(Cost)$$

Where, $[D_{min}, D_{max}]$ is the disparity range, Softmax(●) represents Softmax operation, Disparity represents the initial disparity map obtained by disparity regression, Cost is the 4D matching cost volume after cost filtering;

The initial disparity map of the original resolution is obtained by bilinear interpolation.

Preferably, five step, the final disparity map is obtained by combining the mask map and the initial disparity map, as the following equation:

$$Disparity_{final}(x,y)=Disparity(x,y)*Mask(x,y)$$

where, Disparity is the initial disparity map and Mask is the valid mask map.

Compared with existing methods, the invention has significant advantages: the invention can achieve single-shot, high-robustness and absolute 3D shape measurement by projecting only a single speckle pattern.

The invention is further described in detail below with reference to the accompanying drawings.

BRIEF DESCRIPTION OF THE DRAWINGS

FIG. 1 shows the diagram of the proposed single-shot 3D shape measurement method using an 3D measurement method based on end-to-end deep learning for speckle projection.

FIG. 2 shows the schematic diagram of the invention's stereo matching network based on end-to-end deep learning.

DESCRIPTION OF THE PREFERRED EMBODIMENT

Figure 3:
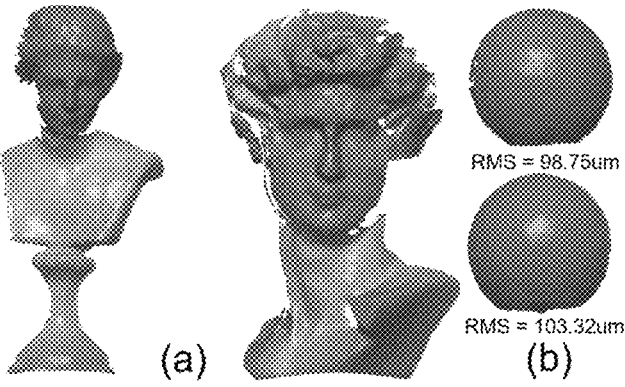
FIG. 3 shows the schematic diagram of the results obtained by the invention.

The invention is a 3D measurement method based on end-to-end deep learning for speckle projection. The steps of the invention are as follows:

step one, the speckle pattern is projected by the projector and collected simultaneously by the stereo camera. The speckle images are stereo rectified and fed into the stereo matching network;

step two, a feature extraction sub-network based on shared weights processes the speckle images to obtain a series of low-resolution 3D feature tensors with customized size.

In the feature extraction sub-network based on shared weight of stereo matching network, the size of speckle pattern is H×W First the speckle patterns are processed by three convolution layers with the same number of output channels to obtain a tensor of size 32×H×W. Then, a tensor of size 32×H/2×W/2 is obtained through a convolution layer with two steps. Then, a tensor of size 32×H/2×W/2 is obtained through three residual blocks in succession. A tensor of size 64×H/2×W/2 is obtained through sixteen residual blocks. A tensor of size 128×H/2×W/2 is obtained through six residual blocks. Then, a tensor of size 128×H/2×W/2 is downsampled at different scales by the average pooling layer and convolution layer with size of (5,5), (10,10), (20,20) and (40,40) respectively, and a tensor with original resolution is obtained by bilinear interpolation. The tensor of original resolution is spliced with the tensor of size 64×H/2×W/2 and the tensor of size 128×H/2×W/2 on the feature channel to obtain a tensor of size 320×H/2×W/2. Finally, a tensor of size 32×H/2×W/2 is obtained through two convolution layers;

step three, the feature tensors are fed into the salient object detection sub-network to detect foreground information in the speckle images, producing a full-resolution valid mask map.

Specifically, a tensor of size 32×H/2×W/2 is fed into three residual blocks to obtain a tensor of 64×H/2×W/2; A tensor of size 32×H×W is obtained through a deconvolution layer; A tensor of size 32×H×W is obtained through three residual blocks; A tensor of size 1×H×W is obtained through a convolution layer without active operation; The final full-resolution valid mask image is obtained through a Sigmoid layer.

Summary of further embodiments, step four, a 4D matching cost volume is generated using the feature tensor of both views based on the candidate disparity range, filtered by a series of 3D convolutional layers to achieve cost aggregation, so that the initial disparity map is obtained by disparity regression.

A 4D matching cost volume is generated using the feature tensor of both views based on the candidate disparity range:

$$\text{Cost}(1{:}32,D_i{-}D_{min}{+}1,1{:}H,1{:}W{-}D_i){=}\text{Feature}_{left}(1{:}32,1{:}H,1{:}W{-}D_i)$$

$$\text{Cost}(33{:}64,D_i{-}D_{min}{+}1,1{:}H,1{:}W{-}D_i){=}\text{Feature}_{right}(1{:}32,1{:}H,D_i{:}W)$$

where $\text{Feature}_{left}$ and $\text{Feature}_{right}$ represent the feature tensors from two perspectives output, their size is 32×H/2×W/2, $[D_{min},D_{max}]$ is the disparity range of our SPP system, $D_i$ is a candidate disparity in the range.

Preferably, the process of the initial disparity map obtained by disparity regression is:

The matching cost volume is fed into the Softmax layer and the initial disparity map is obtained by disparity regression, as shown in the following equation:

$$\text{Disparity} = \sum_{d=D_{min}}^{D_{max}} d * \text{Softmax}(\text{Cost})$$

Where, $[D_{min},D_{max}]$ is the disparity range, Softmax(●) represents Softmax operation, Disparity represents the initial disparity map obtained by disparity regression, Cost is the 4D matching cost volume after cost filtering.

The initial disparity map of the original resolution is obtained by bilinear interpolation.

step five, the final disparity map $\text{Disparity}_{final}$ is obtained by combining the mask map and the initial disparity map to achieve single-shot, high-robustness and absolute 3D shape measurement, as shown in the following equation:

$$\text{Disparity}_{final}(x,y){=}\text{Disparity}(x,y)*\text{Mask}(x,y)$$

Then, based on the calibration parameters of the two cameras, the disparity data is converted into 3D information to realize a single-shot, robust and absolute 3D shape measurement.

The stereo matching network proposed by the invention includes the following parts:

1. Feature extraction subnet based on shared weight;
2. Salient object detection subnetwork;
3. Generate the initial 4D matching cost body;
4. After a series of 3D convolution layer filtering, the cost aggregation is realized to obtain the 4D matching cost after the cost aggregation;
5. The initial disparity map is obtained by disparity regression for the 4D matching cost after cost aggregation;
6. The final disparity map is obtained by combining the effective mask map and the initial disparity map.

EXAMPLE OF IMPLEMENTATION

To verify the actual performance of the proposed method described in the invention, two cameras (Basler acA640-750 um), a DLP projector (LightCrafter 4500Pro), and a computer are used to construct a 3D measurement system based on end-to-end deep learning for speckle projection. The system captures the images at the speed of 25 Hz when measuring 3D profiles of objects. According to step one, the speckle pattern is projected by the projector and collected simultaneously by the stereo camera, the speckle images are stereo rectified and fed into the stereo matching network. The schematic diagram of the invention's stereo matching network based on end-to-end deep learning is shown in FIG. 2. Using the steps from Step 2 to Step 5, a single-shot robust and absolute 3D shape measurement is finally realized. In the whole experiment, 1200 sets of data were projected and captured, of which 800 sets of data are used as the training datasets, 200 sets of data as the validation datasets, and 200 sets of data as the test datasets. It is worth noting that the data in the training set, verification set and test set are not reused. In the network configuration, the loss function is set as mean square error (MSE), the optimizer is Adam, and the training epoch is set as 500. The schematic diagram of the results obtained by the invention is shown as FIG. 3, which shows that the invention only needs to project a speckle pattern to achieve a single-shot, robust and absolute 3D shape measurement.

The invention claimed is:

1. A three-dimensional (3D) measurement method based on end-to-end deep learning for speckle projection, the method being configured to substantially promote matching accuracy for 3D shape measurement by overcoming low matching accuracy of traditional stereo matching algorithms, the method comprising the steps of:

providing a projector and a stereo camera;

projecting a speckle pattern by the projector onto an object;

collecting the speckle pattern projected onto the object simultaneously by the stereo camera to generate speckle images;

stereo rectifying the speckle images;

processing the rectified speckle images by a feature extraction sub-network based on shared weights to obtain a series of low-resolution 3D feature tensors with a customized size, wherein the feature extraction sub-network is configured to extract rich multi-scale feature information for constructing a 4D cost volume;

feeding the series of low-resolution 3D feature tensors into a saliency object detection sub-network to detect foreground information in the speckle images, thereby producing a full-resolution valid mask map;

generating a 4D matching cost volume using the feature tensors derived from a left view and a right view of the stereo camera based on a candidate disparity range;

filtering the 4D matching cost volume by a lightweight 3D U-net network using 3D convolutional layers to achieve efficient cost aggregation and obtain an initial disparity map by disparity regression; and obtaining a final disparity map by combining the full-resolution valid mask map and the initial disparity map.

2. The 3D measurement method according to claim 1, wherein the step of processing the rectified speckle images comprises the sub-steps of:

processing the rectified speckle images with a size of H×W by three convolution layers with the same number of output channels to obtain a tensor of size 32×H×W;

obtaining a tensor of size 32×H/2×W/2 through a convolution layer with two steps;

obtaining a tensor of size 32×H/2×W/2 through three residual blocks in succession;

obtaining a tensor of size 64×H/2×W/2 through sixteen residual blocks;

obtaining a tensor of size 128×H/2×W/2 through six residual blocks;

downsampling the tensor of size 128×H/2×W/2 at different scales by an average pooling layer and a convolution layer with a size of (5,5), (10,10), (20,20) and (40,40) respectively;

obtaining a tensor with original resolution by bilinear interpolation;

splicing the tensor of original resolution with the tensor of size 64×H/2×W/2 and the tensor of size 128×H/2×W/2 on the feature channel to obtain a tensor of size 320×H/2×W/2; and obtaining a tensor of size 32×H/2×W/2 through two convolution layers.

3. The 3D measurement method according to claim 1, wherein the step of producing the full-resolution valid mask map comprises the sub-steps of:

feeding a tensor of size 32×H/2×W/2 into three residual blocks to obtain a tensor of 64×H/2×W/2;

obtaining a tensor of size 32×H×W through a deconvolution layer;

obtaining a tensor of size 32×H×W through three residual blocks;

obtaining a tensor of size 1×H×W through a convolution layer without active operation; and obtaining a final full-resolution valid mask image through a Sigmoid layer.

4. The 3D measurement method according to claim 1, wherein the step of generating a 4D matching cost volume using the feature tensors derived from the left view and the right view of the stereo camera based on a candidate disparity range according to the equation:

$$\text{Cost}(1{:}32,D_i{-}D_{min}{+}1,1{:}H,1{:}W{-}D_i){=}\text{Feature}_{left}(1{:}32,1{:}H,1{:}W{-}D_i)$$

$$\text{Cost}(33{:}64,D_i{-}D_{min}{+}1,1{:}H,1{:}W{-}D_i){=}\text{Feature}(1{:}32,1{:}H,D_i{:}W)$$

where $\text{Feature}_{left}$ and $\text{Feature}_{right}$ represent the feature tensors from two perspectives, a size of which is 32×H/2×W/2, $[D_{min}, D_{max}]$ is a pre-determined maximum disparity range of a measurement system defined by the physical arrangement of the projector and the stereo camera, $D_i$ is a candidate disparity in the range $[D_{min}, D_{max}]$.

5. The 3D measurement method according to claim 1, wherein the initial disparity map is obtained by disparity regression according to the sub-steps of:

feeding the 4D matching cost volume into a Softmax layer;

obtaining the initial disparity map by disparity regression according to the following equation:

$$\text{Disparity} = \sum_{d=D\,min}^{D_{max}} d * \text{Softmax}(\text{Cost})$$

where $[D_{min}, D_{max}]$ is the disparity range, Softmax( ) represents Softmax operation, Disparity represents the initial disparity map obtained by disparity regression, Cost is the 4D matching cost volume after cost filtering; and obtaining the initial disparity map of the original resolution by bilinear interpolation.

6. The 3D measurement method according to claim 1, wherein the final disparity map is obtained by combining the mask map and the initial disparity map according to the equation:

$$\text{Disparity}_{final}(x,y){=}\text{Disparity}(x,y)*\text{Mask}(x,y)$$

where Disparity is the initial disparity map and Mask is the full-resolution valid mask map.

\* \* \* \* \*